(12) United States Patent
Kohlhase et al.

(10) Patent No.: US 6,506,004 B1
(45) Date of Patent: *Jan. 14, 2003

(54) METHOD OF CONTROLLING WORKPIECE MACHINING

(75) Inventors: Matthias Kohlhase, Schramberg-Sulgen (DE); Paul Dieter Scharpf, Schlat (DE); Wolf-Dietrich Voss, Boll (DE)

(73) Assignee: Boehringer Werkzeugmaschinen GmbH, Goeppingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/424,507

(22) PCT Filed: May 28, 1998

(86) PCT No.: PCT/EP98/03203
§ 371 (c)(1),
(2), (4) Date: Mar. 9, 2000

(87) PCT Pub. No.: WO98/53944
PCT Pub. Date: Dec. 3, 1998

(30) Foreign Application Priority Data

May 28, 1997 (DE) .......................... 197 22 454

(51) Int. Cl.[7] ................................. B23C 3/06
(52) U.S. Cl. ................. 409/131; 409/199; 409/203; 29/888.08; 700/173
(58) Field of Search ................ 409/132, 131, 409/200, 199, 213, 217, 203, 192; 29/6.01, 888.08; 82/106; 451/399; 700/173

(56) References Cited

U.S. PATENT DOCUMENTS

| | | | | |
|---|---|---|---|---|
| 1,100,842 A | * | 6/1914 | Overgaard | 409/132 |
| 2,215,007 A | * | 9/1940 | Kraus | 409/132 |
| 2,942,526 A | * | 6/1960 | Maecker | 29/6.01 |

(List continued on next page.)

FOREIGN PATENT DOCUMENTS

| | | | | |
|---|---|---|---|---|
| DE | 195 46 197 C1 | * | 1/1997 | |
| DE | 196 26 627 | | 9/1997 | |
| DE | 196 26 609 | | 1/1998 | |
| GB | 2303091 | * | 2/1997 | |
| JP | 63-102817 | * | 5/1988 | .......... 409/132 |
| WO | WO 96/39269 | | 12/1996 | |
| WO | WO 97/21513 | * | 6/1997 | |

OTHER PUBLICATIONS wt–.ind.Fertig.60 (1970), No. 1, pp. 14–21 entitled "Ermittlung und Berechnung der kostengünstigsten Standzeit und Schnittgeschwindigkeit" by R. Schaumann.
Werkstatt und Betrieb 107 (1974) 2, pp. 111–116 entitled "Programmierte Berechnung der Schnittdaten beim Bohren mit Mehrspindel–Bohrköpfen" by Gherman Draghici et al.
Prospectus Heller entitled "Kurbelwellen–Rundfräsmaschinen RFK".

(List continued on next page.)

Primary Examiner—William Briggs
Assistant Examiner—Erica E Cadugan
(74) Attorney, Agent, or Firm—Crowell & Moring LLP

(57) ABSTRACT

The invention concerns a method of controlling the machining of a workpiece which moves during the machining operation and on which a plurality of tool units operate simultaneously at different machining locations, in particular for controlling the rotary milling of a rotating workpiece such as for example a crankshaft at a plurality of machining locations (A, B, . . . ) simultaneously by separate tool units (a, b, . . . ), which is characterised in that with knowledge of the optimum motion parameters (nkwa, na, xa, ya, . . . ; nkwb, nb, xb, yb, . . . ) of workpiece (KW) and tool (WZ), which are separate for each machining location (A, B), the speed of motion of the workpiece, in particular the rotary speed (nKWa, nKWb) of the crankshaft (KW) and the speeds of motion (na, xa, ya, . . . ;nb, xb, yb, . . . ) of the tool units (a, b . . . ) are so selected that in the sum (S) of all simultaneously machined machining locations (A, B, . . . ) an optimum machining result is achieved overall.

8 Claims, 8 Drawing Sheets

U.S. PATENT DOCUMENTS

| | | | | |
|---|---|---|---|---|
| 4,326,323 A | * | 4/1982 | Kralowetz et al. | 409/199 |
| 4,384,333 A | * | 5/1983 | Maecker | 82/106 |
| 4,790,698 A | * | 12/1988 | Heffron | 409/200 |
| 5,197,172 A | * | 3/1993 | Takagi et al. | 700/175 |
| 5,765,270 A | * | 6/1998 | Schrod et al. | 29/6.01 |
| 5,801,963 A | * | 9/1998 | Sadler et al. | 700/173 |
| 6,038,489 A | * | 3/2000 | Pickles et al. | 82/106 |
| 6,050,757 A | * | 4/2000 | Gesell | 409/132 |
| 6,146,063 A | * | 11/2000 | Ramold et al. | 409/199 |
| 6,283,687 B1 | * | 9/2001 | Santorius et al. | 29/6.01 |
| 6,322,300 B1 | * | 11/2001 | Santorius et al. | 409/199 |

OTHER PUBLICATIONS

Werkstatt und Betrieb, 116 (1983) 2, p. 70.
Werkstatt und Betrieb 123 (1990) 12, pp. 915–920 entitled Drehen –Drehräumen –ein neues Verfahren zum Fertigen von Kurbel –und Nockenwellen by Gerhard Augsten et al.
Programming Instructions uni–Pro NC80R, Dec. 17, 1993.
Bosch Order, May 9, 1996, pp. 1–10.
Opponents' delivery note No. 02719 of Apr. 24, 1997, pp. 1–2.
Heller letter to Bosch of May 21, 1997.
Uni–Pro CNC90R Programming Instructions.
Order form Mercedes–Benz dated Sep. 13, 1994, pp. 1–4.
Heller delivery note No. 96736 dated Jan. 16, 1995.
Heller delivery note No. 98391 dated Mar. 8, 1996.
Heller letter to Mercedes–Benz dated Jun. 17, 1996, pp. 1–2.
Subscription confirmation in programming course, pp. 1–4.
Working plan for crankshaft machining, pp. 1–4.
VDW, Oct. 1972, entitled "Adaptive Control bei Werkzeugmaschinen" by G. Stute.
Opinion entitled Gutachterliche Stellungnahme zur Steuerung des Rundfräsbearbeitungsvorganges bei der Kurbelwellenfertigung auf einer Heller RFK–Maschine der Firma Hellerm Nürtingen.
PDV Berichte, Sep. 1976 entitled "Project Process Control".

* cited by examiner

METHOD OF CONTROLLING WORKPIECE MACHINING

BACKGROUND AND SUMMARY OF THE INVENTION

The invention concerns a method of controlling the machining of a workpiece which is moving during the machining operation and on which a plurality of tool units operate simultaneously at different machining locations.

A machining operation, in particular a cutting machining operation on a metal workpiece, can be greatly influenced by varying the motion parameters of the workpiece and the tool, in particular the motion parameters relative to each other. In that respect, the endeavour is to achieve a given optimisation aim or target in the machining procedure, for example achieving a surface quality which is as high as possible, achieving an overall machining time which is as short as possible for each workpiece, or achieving the longest possible service life for the tools. The latter is nowadays the most frequent optimisation target, in consideration of the primary target of reducing costs.

Hereinafter reference is specifically made to machining a crankshaft by means of rotary or turning milling, in which a milling tool which rotates relatively quickly machines peripheral surfaces and/or end faces on a crankshaft which rotates relatively slowly, without however the present invention being limited thereto.

In cutting machining operations such as rotary milling, in particular high-speed rotary milling. optimisation of the machining procedure is governed not only in accordance with the cutting speed, that is to say the relative speed of the tool cutting edge relative to the workpiece at the respective machining location, but also a plurality of other factors such as temperature at the machining location, maximum and average depth of cut, spacing in respect of time between a cutting edge coming out of engagement and fresh engagement of the next cutting edge of the same tool, and so forth.

As two or more milling units which are controllable independently of each other in respect of their motion parameters and in particular their speed of rotation operate simultaneously on the rotating crankshaft at for example different axial positions, it is not possible to set all machining locations in themselves respectively to 100% of the possible optimisation target, as that is prevented by virtue of the speed of crankshaft rotation which can admittedly be freely selected but which is the same for all machining locations.

In accordance with DE 195 46 197 C1 therefore it is proposed that the motion parameters and in particular the speed of rotation of the crankshaft are to be so selected that 100% optimisation of machining is achieved at one of the machining locations. The resultant speed of crankshaft rotation has to be accepted for the other machining locations as an unavoidable input parameter so that these other machining locations can no longer achieve a 100% degree of optimisation.

The speed of crankshaft rotation therefore represents the master setting for the other machining locations, on the basis of the master-slave principle.

The disadvantage of that method however is that it provides that machining can admittedly be implemented in the optimum fashion for one of the machining locations, but it is not possible to achieve optimisation of the machining result, over the sum of the machining locations.

Accordingly the object of the invention is to provide a method of controlling such a machining procedure, which permits optimisation over the entire machining operation.

That object is attained by the characterizing features of the invention. Advantageous embodiments are set forth in the appendant claims.

That procedure admittedly means that the motion parameters, in particular the speed of crankshaft rotation, involve values which differ from the respective corresponding optimum values in respect of the individual machining locations, but on the other hand optimum machining is made possible in terms of the overall effect of the machining procedure.

It is only by departing from the motion parameters and in particular the speed of crankshaft rotation which would be the optimum value for a single one of the plurality of machining locations in operation at the same time, that it is possible to achieve an optimum machining result in terms of the overall effect thereof.

That can be verified on the basis of the following numerical example:

Looking at the crankshaft indicated at KW, high-speed external milling cutters a, b operate thereon at the two machining locations A, B. It will be assumed that the optimisation target is the longest possible service life for the milling cutters a and b respectively.

In accordance with the above-described known method, for example the machining location A would be 100% optimised, insofar as at that location, with the following parameters:

speed of crankshaft rotation nKW: 15 rpm, and
speed of rotation of the milling cutter na: 120 rpm, the cutter service life ta achieved is 1000 minutes.

Because the value of nKW=15 rpm, a relative optimisation effect is achieved at the machining location B by virtue of the fact that the milling cutter b rotates there at a value nb of 40 rpm, which provides a service life tb for that milling cutter b of 600 minutes.

If in contrast the speed of crankshaft rotation nKW were to be increased to for example 17 rpm, the speed of rotation na of the milling cutter a would therefore have to be raised to 140 rpm and that would involve a service life ta of only 950 minutes.

It will be noted however that, for the milling cutter b which would then rotate for example at a speed of 50 rpm, that could involve a service life of 700 minutes.

In overall total therefore the service life of the tools at 950+700=1650 minutes would be 50 minutes higher than with the previously known method which only afforded values of 1000+600=1600 minutes.

In addition, the shortest prevailing service life of the milling cutters a, b which are in operation at the same time is raised from 600 to 700 minutes, which means that, when beginning the machining procedure with two new milling cutters a, b, the first time a milling cutter has to be changed is only after 700 minutes and not after 600 minutes, and this could play an important part in terms of reducing the frequency of tool changes over the machine as a whole as the optimisation target.

BRIEF DESCRIPTION OF THE DRAWINGS

The features of the present patent application are described by way of example in greater detail hereinafter with reference to the drawings in which.

DETAILED DESCRIPTION OF THE DRAWINGS

Figure 1A:
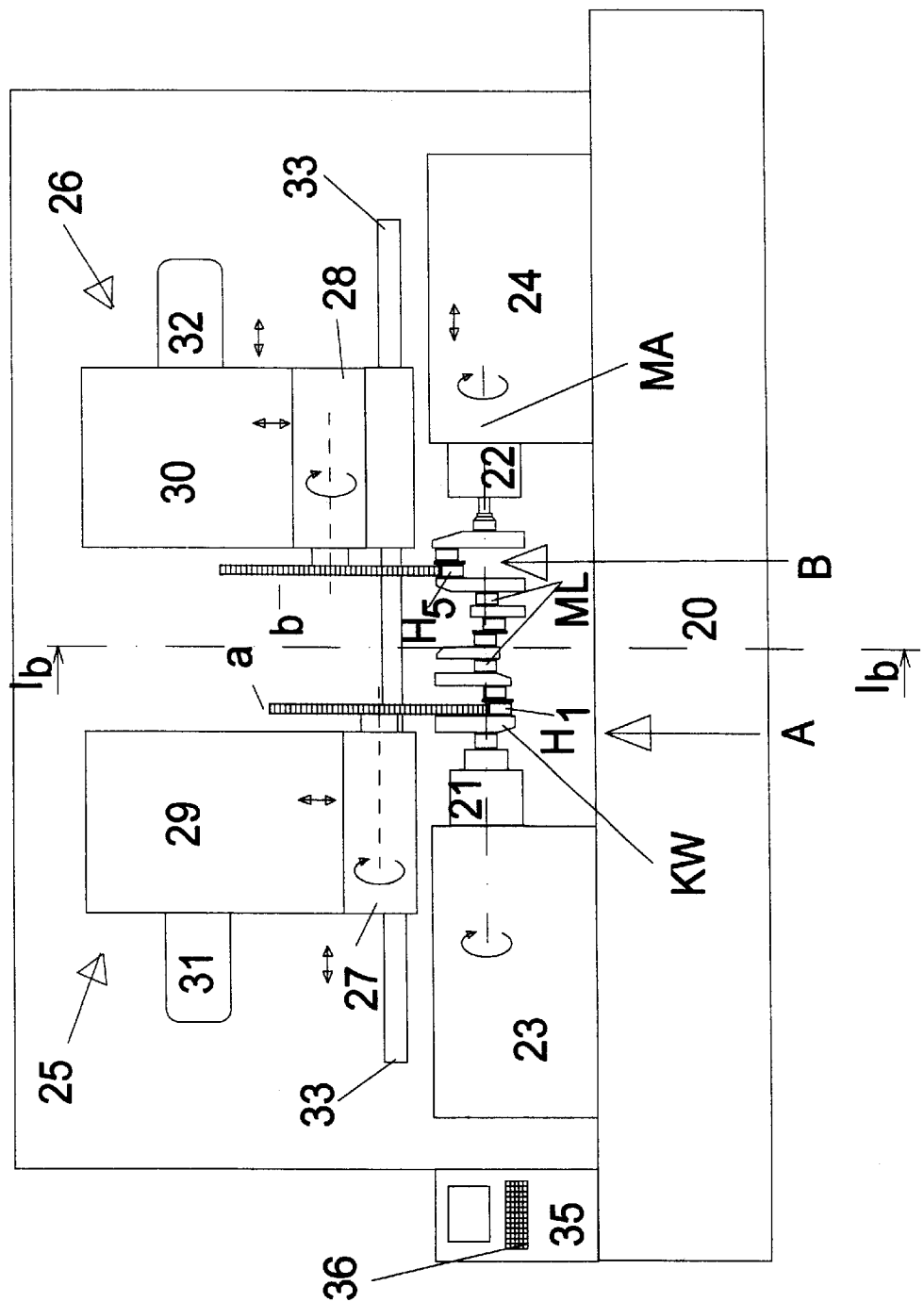
FIG. 1a is a plan view of a machine which simultaneously machines a crankshaft at two locations.
Figure 1B:
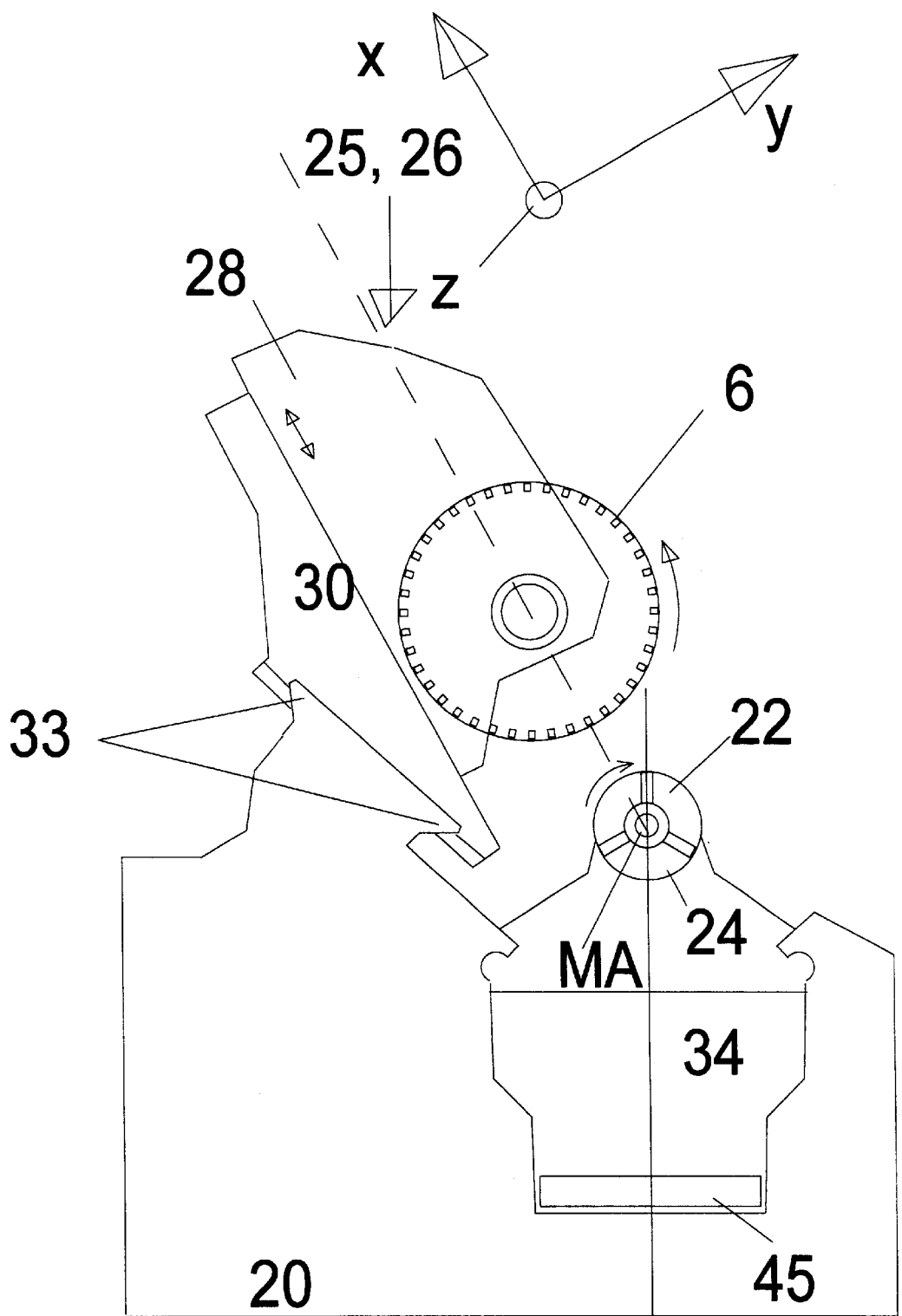
FIG. 1b shows the machine of FIG. 1a, viewing in the axial direction thereof.

The milling machine shown in FIGS. 1a and 1b includes a bed 20 with a chip or cuttings trough 34 and a chip or cuttings conveyor 45 disposed therein. Disposed above the trough 34 at a spacing in the Z-direction and directed in mutually opposite relationship are two headstocks 23, 24 of which at least the one headstock 24 is displaceable in the Z-direction.

The headstocks 23, 24 in turn carry mutually oppositely directed chucks 21, 22 which are drivable in rotation and which are synchronised with each other in respect of their rotational movement at least electronically and possibly mechanically.

Clamped between the two chucks 21, 22 is a crankshaft KW which is gripped by the chuck 21 at its end flange and by the chuck 22 at its end journal, that is to say on the center line MA of the crankshaft KW, which thus coincides with the headstock axis. In that respect, the clamping surfaces, that is to say the peripheral surfaces at the end flange and at the end journal are previously machined and in particular are subjected to previous cutting machining, while in addition suitable abutment surfaces are provided by previous machining on the crankshaft for fitting the crankshaft into the chucks 21, 22 in a defined rotational position.

As the headstocks 23, 24 not only drive the crankshaft in rotation but can also position it in respect of its rotational position (defined as the C-axis) the crankshaft KW which is clamped therein can at any time be moved into the desired rotational position during the machining operation, more specifically at a defined speed.

Z-guides 33 are arranged behind the trough 34 viewing in the direction in FIG. 1a and rising inclinedly rearwardly from the trough 34, being supported on the bed 20 of the milling machine. The lower slides or saddles 29, 30 which can be seen in FIG. 1a, for the tool supports 25, 26, are displaceable in the Z-direction on the guides 33.

Carried displaceably on each of the slides or carriages 29, 30 is an upper slide or carriage 27, 28, each of which carries a respective disk milling cutter a, b drivable in rotation about an axis which is parallel to the Z-axis.

In that arrangement, the upper slides or carriages 27, 28 are movable relatively steeply from above at an angle of less than 45° relative to the perpendicular in the X-direction towards the center line MA. The X-guides between the upper slides or carriages 27, 28 and the lower slides or carriages 29, 30 preferably coincide with the connection of the center points of the disk milling cutters a and b respectively and the center line MA.

In order to be able to use such a milling machine with an externally toothed disk-type milling cutter for machining the periphery of a big-end bearing journal H1, H2 over the entire periphery thereof, the crankshaft 1 which is clamped on the center line MA must perform at least one complete revolution during the machining procedure.

As can best be seen from FIG. 1a, during the rotary movement of the crankshaft 1, by means of the tool supports 25, 26, the disk milling cutters a, b which are simultaneously in operation at different machining locations are continuously adjusted in the X-direction.

As will be described in greater detail hereinafter therefore the movements of the two tool supports 25, 26 are indirectly dependent on each other insofar as they depend on the rotary movement of the crankshaft which is being jointly machined, and the geometry of the eccentric surfaces to be machined.

If in that respect optimisation of the machining procedure is to be implemented by those plurality of mutually independently controllable supports, for example in terms of achieving a given chip thickness or depth of cut or in regard to achieving a tool service life which is of optimum length in regard to its total for the crankshaft, the disk milling cutters a, b not only move differently in the X-direction, but for the major part they also rotate at different, continuously adapted speeds of rotation.

The machine control system which jointly controls the milling cutters a, b and also their supports 25, 26 and the rotary movement of the headstocks, that is to say of the crankshaft KW, can additionally be appropriately corrected with correction values by way of an input panel 36 on the machine, on the basis of the machining result obtained in a practical situation on the first items in a series of workpieces.

Figure 2:
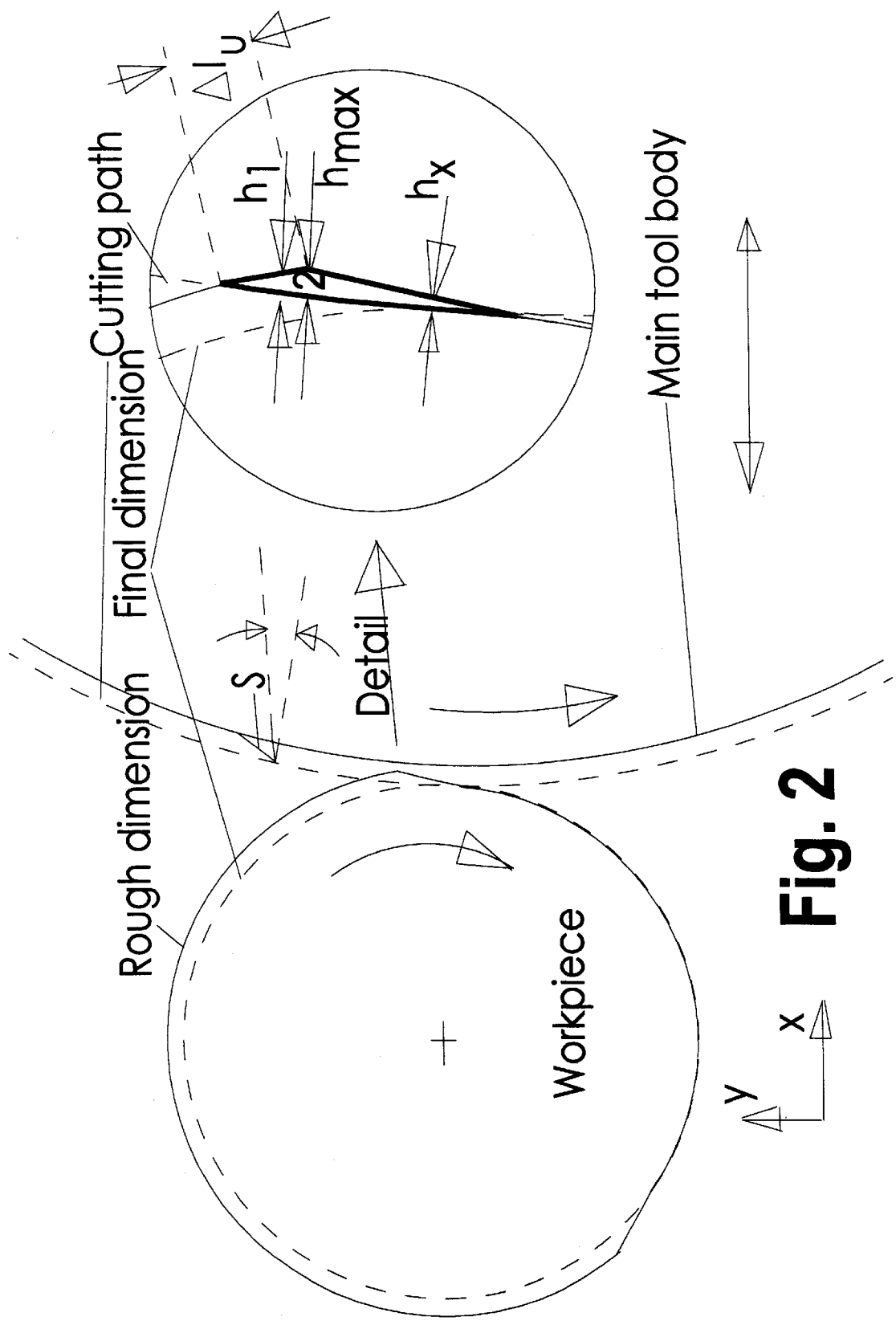
FIG. 2 is a diagrammatic view showing the principle of the cutting procedure.

FIG. 2 is a view looking in the direction of the Z-axis showing the basic situation when machining a peripheral surface, for example the journal of a crankshaft, but also a non-round peripheral surface, by means of external milling. A view of the machining location on an enlarged scale is illustrated in the right-hand part of FIG. 2.

The workpiece is to be machined from the larger rough dimension to the smaller final dimension.

In that case, the cutting edges S of which only one is illustrated project radially beyond the main tool body in order to be able to remove material in that way. In this case, the main tool body is displaceable in a defined manner in the X-direction and rotates in the counter-clockwise direction. As the milling procedure is to be implemented in co-directional relationship, the workpiece rotates in the clockwise direction so that the tool and the workpiece are moving in the same direction at the machining location.

As the view on an enlarged scale in FIG. 2 shows, the new cutting edge S will produce a chip or cutting 2 which is defined in cross-section by two convex arc segments and a concave arc segment and which is in the shape of a flat, irregular triangle.

In that configuration, the concave side is the flank produced by the preceding cut and the long convex side is the flank produced by the new cutting edge S. The short convex flank is the length $\Delta l_U$ measured along the periphery of the respective workpiece portion, that is to say the peripheral length between the points at which two successively arranged cutting edges of the tool impinge on the periphery of the workpiece.

It will be appreciated that in a practical context the chip or cutting 2 does not retain the shape shown in FIG. 2, but is rolled up in a spiral by virtue of the deflection effect at the rake surface of the cutting edge.

It will be seen from FIG. 2 that—as viewed in the direction passing through the cutting edge—the chip 2 firstly increases rapidly in its chip thickness, for example $h_1$, to the maximum chip thickness at $h_{max}$. From there, the chip thickness continuously decreases relatively slowly to the end (for example $h_x$).

It will be clear from this view, if the difference between the rough dimension and the final dimension of the workpiece remains the same and if the speed of rotation of the workpiece also remains the same, that a reduction in the speed of rotation of the tool causes an increase in the cutting distance $\Delta I_U$, and thus also an increase in $h_{max}$.

Figure 3:
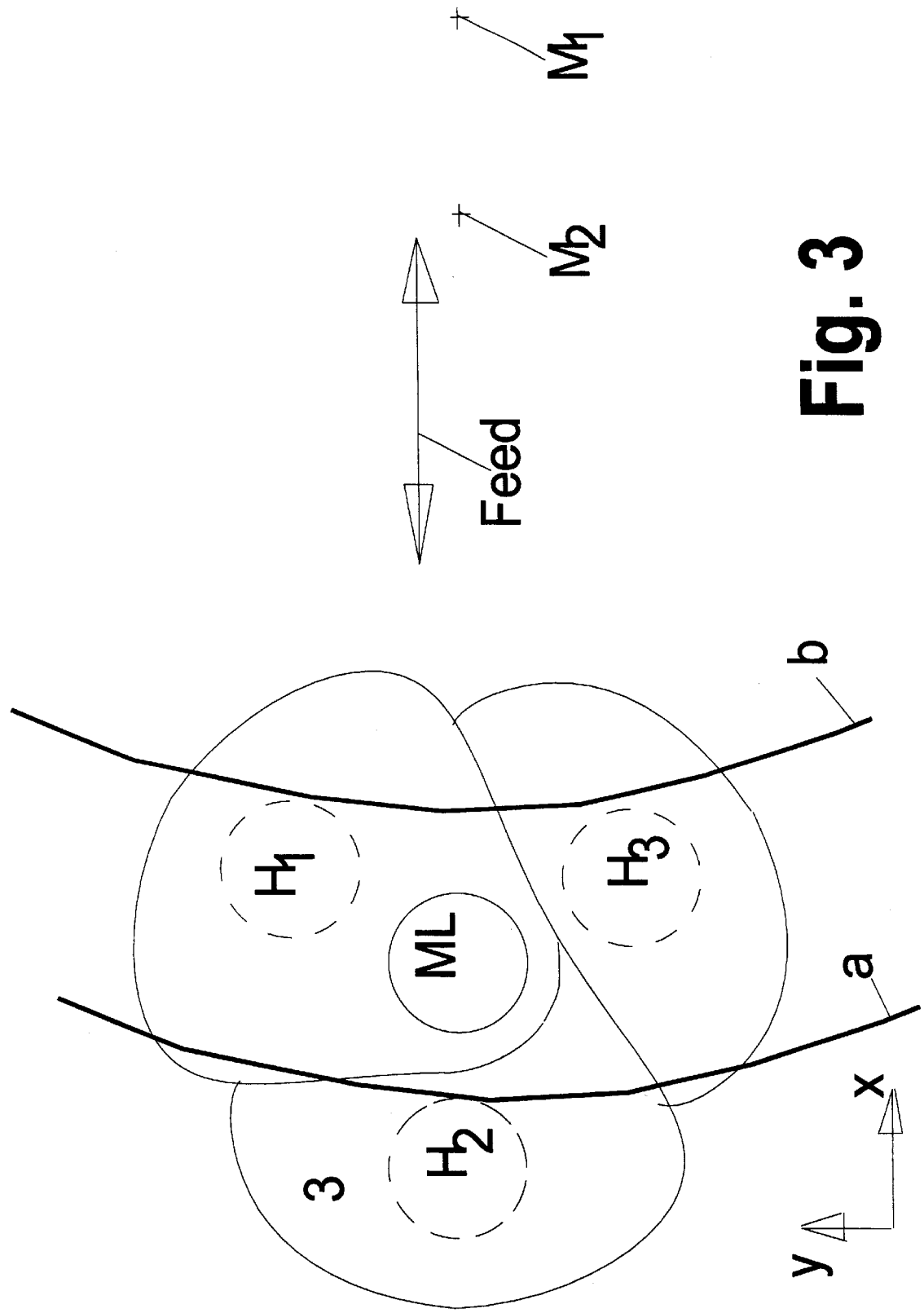
FIG. 3 is a diagrammatic view showing the principle involved when machining at two different stroke or big-end bearing journals.

FIG. 3 shows, considered once again in the Z-direction, for example a crankshaft for a 6-cylinder in-line engine with three big-end bearings H1–H3 which are positioned differently in terms of their rotational position with respect to the center or main bearing ML.

Two separate tools, for example disk-shaped external milling cutters a, b, are in operation on that crankshaft, at different axial positions. One of the tools could be machining for example the big-end bearing journal H1 while the other could be machining for example the big-end bearing journal H2. as shown in FIG. 3, but equally one of the tools could be machining a big-end bearing journal while the other of the tools could be machining the end face of a crank web.

In the latter case, in theory the crank web machining operation could be in part effected with the crankshaft in a stationary condition, by a procedure whereby the tool a or b in question operates along the end face of the crank web in the feed direction, that is to say in the X-direction. As however, when the crankshaft is stationary, no progress in the machining operation can be achieved in the machining procedure which is being carried out at another axial position on a peripheral surface, whether it is the surface of a big-end bearing journal H or a main bearing ML, the procedure for machining the crank web surface is preferably also carried out when the crankshaft is rotating.

In that case, at a commencement of the crank web machining procedure in the crankshaft position shown in FIG. 3 and with subsequent further rotational movement of the crankshaft, the operating procedure involves cutting paths of movement $S_a, S_b, S_m, S_x$, of which some are shown in FIG. 3.

As will be seen, because the milling cutter rotates in co-directional mode with the rotational movement of the workpiece, those cutting paths, at their beginning, are at a greater spacing from each other than at their end, that is to say at the point at which the cutting edge passes out of the side surface of the crank web.

Figure 5:
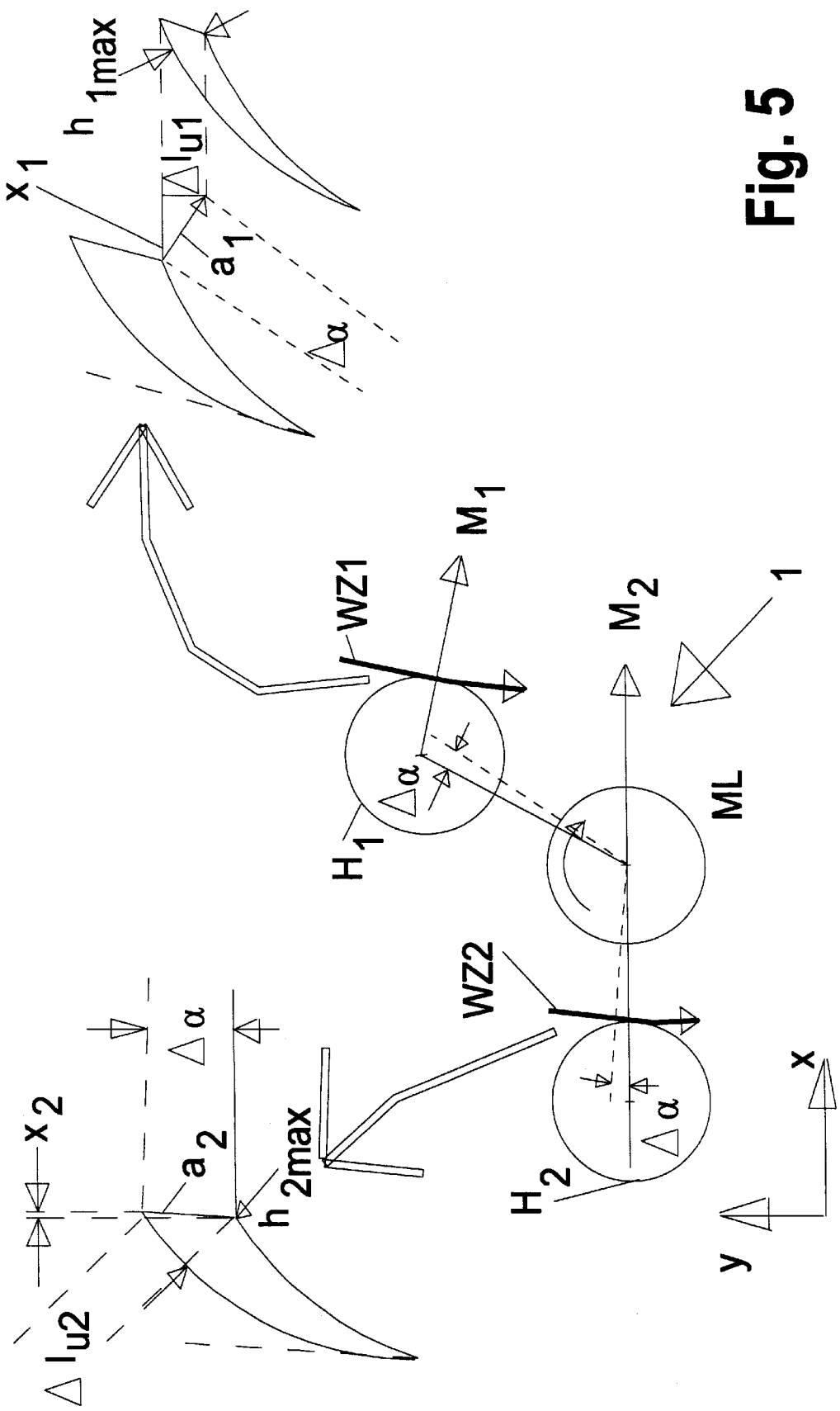
FIG. 5 shows detail views relating to the cut chip form.

FIG. 5 shows the more detailed relationships involved when two separate tools WZ1, WZ2 are simultaneously machining two different big-end bearing journals H1, H2. The tools WZ1 and WZ2 can be displaced in a defined fashion independently of each other in the X-direction and can be controlled in respect of their speed of rotation. The linking factor however is the rotary movement of the crankshaft as the workpiece, which is driven in rotation also in a controlled manner about the main bearings and which can also be stopped in certain working operations.

In the situation shown in FIG. 5, the big-end journal H2 is disposed on a line with the main bearing ML1 and the center points M1 and M2 of the tools WZ1 or WZ2. The big-end bearing journal H1 is displaced through about 120° in the clockwise direction with respect to the main bearing.

If, as stated, the tools WZ1 and WZ2 respectively rotate in the counter-clockwise direction and the crankshaft rotates in the clockwise direction as shown at its main bearing ML, it will be seen that milling is effected at the big-end bearing journal H1 using the co-directional procedure, as is wanted for the above-specified reasons.

At the big-end bearing journal H2, there could be the impression that this involves counter-directional milling as the tool WZ2 at that location is moving downwardly whereas the big-end bearing journal H2 is moving upwardly.

However, in assessing whether the situation involves co-directional or counter-directional milling, the absolute movement of the big-end bearing journal is not an important consideration, but rather the important consideration is whether the big-end bearing journal H2 is performing relative to its own center point a rotational movement which always causes its surface at the machining location to move in the same direction as the milling cutter.

It will be seen however that the big-end bearing journal H2 which, when considered in absolute terms, is moving upwardly in FIG. 5, rolls upwardly along the tool WZ2 so that, relative to the center point of the big-end bearing journal H2, there is a rotational movement of the big-end bearing journal in the clockwise direction and thus there is de facto a co-directional relationship at the machining location.

FIG. 5 also shows the necessarily occurring relationship between machining at the two big-end bearing journals H1 and H2, which is to be taken into consideration in particular in regard to optimising a plurality of simultaneously occurring machining operations, in regard for example to a given chip thickness or depth of cut:

It will be assumed that the milling cutter WZ2 is rotating relative to the crankshaft 1, of which for the sake of simplicity of the drawing FIG. 5 shows only the main bearing ML and the two big-end bearing journals H1 and H2 which are being machined at the present time, so quickly that between the engagement of two successive cutting edges of the tool WZ2 with the big-end bearing journal H2. the crankshaft has continued to rotate through the angle $\Delta\alpha$. As in FIG. 5 the center point of the big-end bearing journal H2 and the center point of the crankshaft, that is to say the main bearing ML, lie on a line with the center M2 of the tool WZ2, the pivotal angle $\Delta\alpha$ causes a displacement $a_2$ of the point of impingement of the new cutting edge with respect to the old cutting edge, such displacement extending almost precisely in the Y-direction.

By virtue thereof, only a very small X-component $x_2$ has to occur by virtue of corresponding X-movement of the tool WZ2 and the resulting cutting spacing $\Delta I_{U2}$ causes a chip cross-section, the thickness of which should correspond to the optimum chip thickness.

If possible the same chip thickness is also to be achieved at the machining location on the big-end bearing journal H1. The center point of the big-end bearing journal H1, assuming the same speed of rotation and the same diameter in respect of the tools WZ1 and WZ2, has also been pivoted with respect to the center of the big-end bearing journal by the angular amount $\Delta\alpha$, until the next cutting, edge of the tool WZ1 comes into engagement.

In that respect, the displacement a1 produced thereby at the machining location is greater than $a_2$ as the distance from the center of the main bearing ML to the machining location at the big-end bearing journal H1 is slightly greater than to the center of the big-end bearing journal H1. That displacement $a_1$ has a pronounced component $x_1$ in the X-direction, which has to be compensated by corresponding movement of the tool WZ1 in the X-direction. That means that, of $a_1$, there remains only a relatively small proportion as the cutting spacing $\Delta I_{U1}$ in the Y-direction. That would give the thin chips shown at the outside right part of FIG. 5. with a maximum thickness of only $h_{1max}$, which is very much less than the optimum chip thickness.

In order now also to arrive at the optimum chip thickness at that machining location, the speed of rotation of the tool WZ1 must be reduced with respect to the speed of rotation of the tool WZ2 in such a way that the cut spacing $\Delta I_{U1}$ rises until the desired chip thickness is also achieved at the big-end bearing journal H1. In that respect, it is necessary to provide for a reduction in the speed of rotation of the tool WZ1 to about 30% of the speed of rotation of the tool WZ2.

Besides the above-described first optimisation target in respect of a given, mean or maximum chip thickness, the secondary optimisation target could be a cutting speed which is to range within a predetermined target window or which should not exceed a given maximum value.

Figure 4:
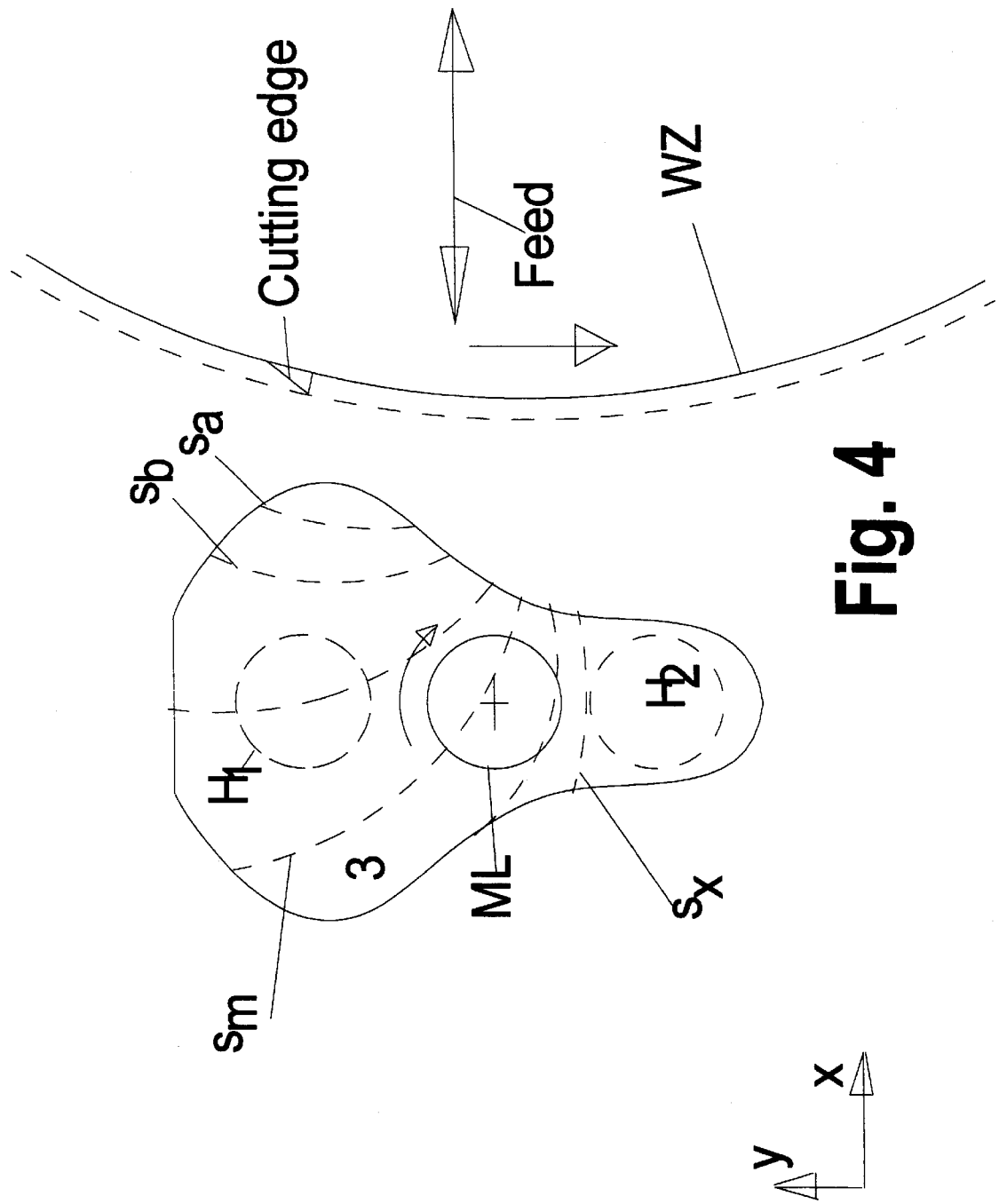
FIG. 4 is a diagrammatic view showing the principle when machining the crank web end face.

The mutual dependencies which are shown in FIG. 5, in particular when maintaining a given chip thickness, occur to an increased degree when one of a plurality of simultaneous machining locations on the crankshaft involves machining an end face of a crank web, as is shown in FIG. 4. The view in FIG. 4 illustrates a crankshaft for example for a 4-cylinder in-line engine in which the big-end bearing journals H1 and H2 are in mutually opposite relationship in the radial direction with respect to the main bearing ML.

If machining of the crank web surface 3 by the tool WZ were begun in the position shown in FIG. 4. the crankshaft would further rotate about the center of the main bearing ML in the specified direction, in the clockwise direction, while the tool WZ rotates in the counter-clockwise direction in order to achieve co-directional milling.

Some of the cutting paths of movement $s_a$, $s_b$, $s_m$, $s_x$ are indicated on the crank web surface 3.

Because of the simultaneous rotational movement of the crankshaft, that procedure gives rise to chip cross-sections which once again are markedly larger at the beginning of the chip than towards the end of the chip, and in addition the chips differ greatly in terms of the chip length, in dependence on the respective position of the cutting path of movement on the crank web surface 3.

It is generally not possible to completely manage without a rotary movement of the crankshaft as, if that were to be the case, machining of a bearing journal, which is just taking place at another location on the crankshaft, would no longer bring about any machining progress.

If therefore a plurality of crank web side surfaces are to be simultaneously machined on a crankshaft or if a crank web side surface is to be machined simultaneously with the machining of a bearing journal, the discrepancies shown by the example in FIG. 5 occur to an increased degree, in the chip thicknesses between the various machining locations, with all tools being of the same diameters and involving the same speeds of rotation, so that the speeds of rotation and/or when machining crank webs also the movement in the transverse direction, that is to say the X-direction, by the milling cutter, have to be continuously altered to an increased degree, if the desired optimum chip thickness is to be simultaneously maintained in each phase of the machining procedure and at all machining locations.

It is highly probable however that the first optimisation target is the service life of the cutting edges, as on the one hand the dead time or idle time of the installation, which is caused by the operation of replacing tools, and on the other hand the costs of the replacement tool itself, are the factor which most severely influences the efficiency of the installation. Maintaining a given band width for the mean chip thickness or not exceeding a maximum chip thickness is frequently selected as a substitute, as an auxiliary parameter for improving the tool service life, in the absence of other indicators. In that respect the important consideration is in particular that the service life of the tools is as high as possible. That can mean the following:

if for example the six or even more bearing locations including the adjoining crank web faces are being machined for example with two disk milling cutters, the longest possible service life of each individual one of the two tool units a, b or WZ1, WZ2 which are generally in operation at the same time, or optimisation of the service life to the effect that the two or even more tools a, b . . . on a machine are worn as far as possible at the same time and can be changed at the same time (maximisation of the periods of time between tool changes).

As the tools a, b do not necessarily wear uniformly rapidly, by virtue of a not entirely symmetrical configuration of the crankshaft or the blanks for the crankshaft, this can mean under some circumstances that it is not the case that each individual one of the tools a, b, c is optimised in regard to a service life which is as long as possible, when considered in itself, during the machining procedure, but under some circumstances the tools which wear more slowly in optimum machining, for example the tool b, is deliberately operated so as to be more intensive in terms of removal, for example at a higher cutting speed etc or with a larger chip thickness or depth of cut, as there is no purpose in delaying the wear limit of that tool b beyond the wear time of the tool a.

It is possible in that way to provide that all tools on a machine, that is to say tools a, b . . . and so forth, are changed jointly.

For that purpose it is also necessary under some circumstances for machining operations which, in regard to the shortest possible machining time, were implemented by a tool a which in any case wears more quickly, to be deliberately and specifically effected by the tool b.

Figure 6:
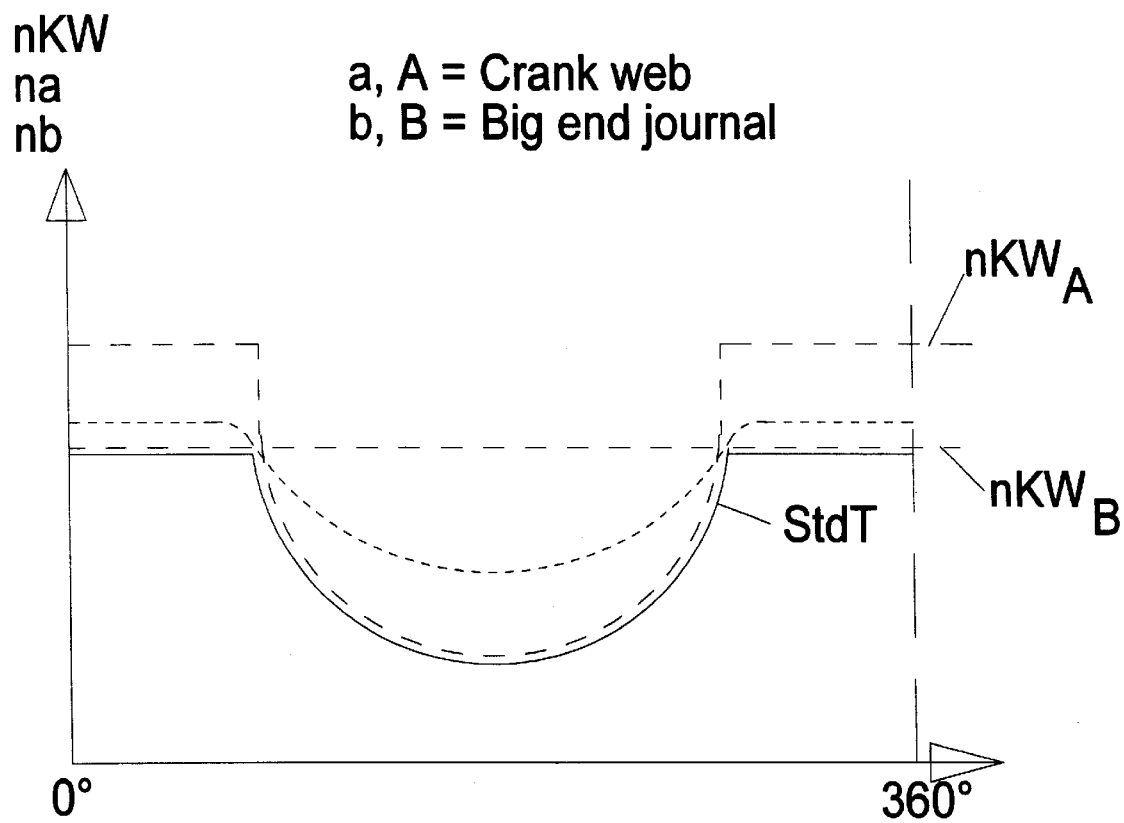
FIG. 6 is a view regarding optimisation over two machining locations.

FIG. 6 shows a given machining condition on a crankshaft in which the crankshaft is being simultaneously machined at two machining locations A, B by tools a, b. In this case, the machining location A involves the machining of a crank web end face (possibly together with the adjoining big-end bearing journal surface), while the machining location B involves machining of a big-end bearing journal. For each bearing location when considered on its own, there would be an optimum rotary speed nkwb which is always uniform, for the machining location B, that is to say for machining of the big-end bearing journal, over an entire revolution of the crankshaft.

The corresponding characteristic curve for the optimum speed of rotation of the crankshaft solely for the machining location A, that is to say machining the crank web, which is identified by $nkw_A$, is in contrast in the shape of an inverted hat and extends in part beneath and in part above the optimum speed of rotation for the machining situation B.

In this respect the basic starting point adopted is in particular identical milling cutter rotary speeds (na=nb).

As an identical crankshaft rotary speed must be established, it is already known to select the lower rotary speed which occurs at each angular position, as shown in the solid line indicated at StdT, being state of the art.

In a corresponding fashion, in the optimisation procedure in the state of the art, that rotary speed $nkw_B$ would be selected, with the result that a degree of optimisation of 100% would be involved for the machining location B. but a degree of optimisation only of 70% for the machining location A.

Admittedly, the optimisation procedure according to the invention provides that, for example in the region just above the 0° crankshaft position, due to the speed of rotation being too high for the machining location B, the degree of optimisation at that machining location B is worsened, but in contrast it is improved for the machining location A, more specifically by a greater amount than the worsening effect at the machining location B. Accordingly however, when considered in total over the machining locations A, B, ... that would afford a better optimisation effect than when using the optimisation procedure in accordance with the state of the art.

FIG. 6 only shows the dependency of the speed of crankshaft rotation on the crankshaft position. Irrespective of the speed of crankshaft rotation nKW however it is also possible to alter the milling cutter rotary speed na of the milling cutters a, b which operate at the machining locations A, B.

Figure 7:
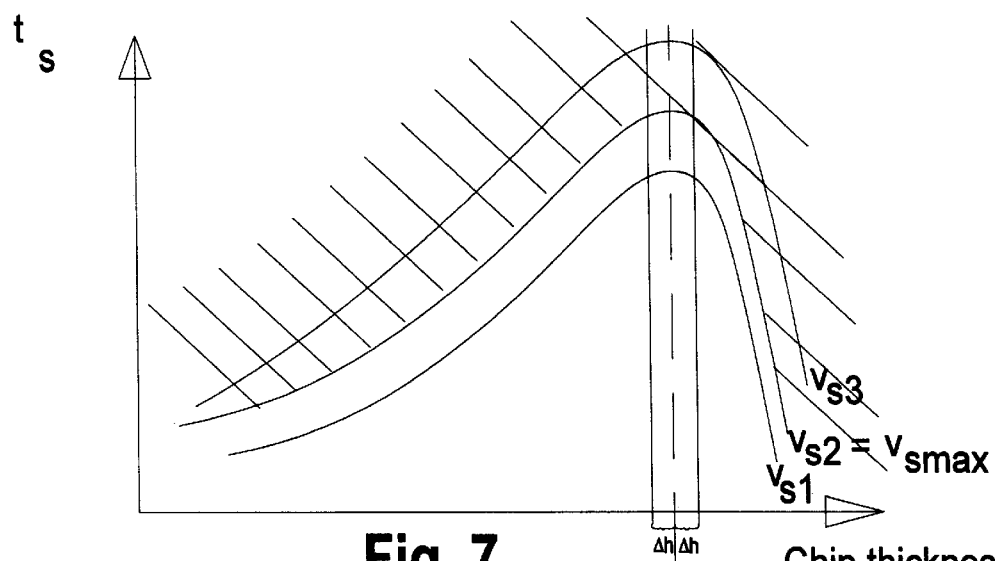
FIGS. 7 and 8 are views showing the service life pattern in relation to speed of rotation or cutting speed.
Figure 8:
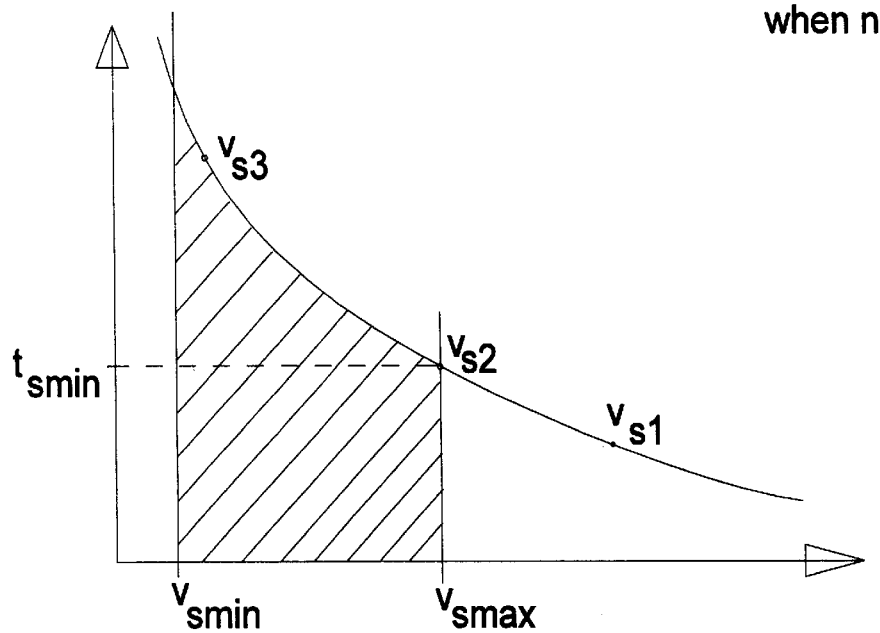

FIGS. 7 and 8 show in that respect the relationships between the tool service life $t_s$, the chip thickness or depth of cut h and the cutting speed $v_s$.

As FIG. 7 shows, the service life $t_s$ plotted against the chip thickness h gives an asymmetrical cap-shaped curve so that the service life $t_s$ reaches a relative maximum at a chip thickness $h_{opt}$. In the region $\pm \Delta h$ in which that cap-shaped curve still drops away relatively shallowly, the service life $t_s$ is still approximately optimal.

In that respect the chip thickness corresponds to the crankshaft speed nKW if the rotary speed of the milling cutter remains constant, in which respect it is only a secondary consideration whether the maximum chip thickness $h_{max}$ or the average chip thickness of a chip is adopted as the basic starting point.

Each of the cap-shaped curves in FIG. 7 corresponds to a given cutting speed $v_s$.

For, as shown in FIG. 8, an inversely exponential relationship obtains between the service life $t_s$ on the one hand and the cutting speed $v_s$ on the other hand, so that the service life can therefore be greatly improved, with decreasing cutting speed.

Insofar as the diameter of the individual big-end bearing journals is identical, the situation as shown in FIG. 7 also applies in the same manner in regard to all big-end bearing journals of a crankshaft to be machined.

If now the service life of the tools is to be optimised in total over all machining locations, or however at least over the two machining locations A, B which are machining simultaneously, then the procedure to be adopted is as follows:

A lower limit in respect of the service life $t_s$ which in FIG. 8 corresponds to a given cutting speed $V_{s2}$ is predetermined as a minimum requirement in the curve shown in FIG. 8. Therefore only the hatched region, that is to say $v_s \leq v_{smax}$, is to be admitted for the machining operation. This corresponds in FIG. 7 to the group of curves of $v_{s2}$ and above.

Now, for achieving an optimisation effect at the machining locations A, B, ... which are being machined simultaneously, the procedure is such that, for example for the machining location A in FIG. 7, the curve with the highest cutting speed that is still admissible, that is to say the cutting speed $v_{s2}$, is selected, and there in turn the point with the longest service life, corresponding therefore to the chip thickness $h_{opt}$. With the chip thickness $h_{opt}$ thus being fixed and with the cutting speed $v_{s2}$ now also being fixed, that necessarily involves a speed of crankshaft rotation $nKW_A$ for that machining location A. As FIG. 7 shows, the highest points of the group of curves $t_s=f(h)$ are disposed substantially vertically one above the other.

For reasons of service life optimisation, the chip thickness $h_{opt}$ is now also to be selected for the machining location B. Because the speed of crankshaft rotation is already fixed at $nKW_B=nKW_A$, that necessarily involves a given curve from the group of curves in FIG. 7. If this is a curve which is in the admissible region, for example $v_{s3}$, then the speed of milling cutter rotation nb corresponding to that cutting speed $v_{s3}$ is selected, and simultaneous machining is effected at the machining locations A, B with the parameters nKW, na, nb which are now known.

If however the result of that procedure is a cutting speed which is not admissible, in the form for example of the curve $v_{s1}$ in FIG. 7, for the machining location B, then instead of that curve the curve $v_{s2}$ which is just still admissible is adopted for the machining location B, accordingly therefore at the machining location B, together with the cutting speed, the speed of crankshaft rotation $nKW_B$ is necessarily also reduced, as the chip thickness $h_{opt}$ is to remain unchanged.

Because of the feedback effect by way of the common speed of crankshaft rotation, this means, in regard to the machining location A, that this machining location A does not involve the curve corresponding to the cutting speed $v_{s2}$, as was originally arbitrarily set in FIG. 7, but a curve at a higher level, for example $v_{s3}$. At the machining location A, in comparison with the arbitrarily set initial situation, the cutting speed and the speed of crankshaft rotation are therefore reduced, to the benefit of maintaining the optimum chip thickness.

In addition, as FIG. 8 shows, the cutting speed $v_s$ cannot be reduced just as may be desired as a maximum cycle time within which the crankshaft is to be in the finished machined condition is predetermined, generally by the customer, for the manufacturing procedure. That also determines the maximum available time for simultaneous machining at the machining locations A, B. That governs the minimum necessary cutting speed $v_{smin}$ in FIG. 8.

An additional possible variation also provides that, when establishing the chip thickness in FIG. 7, it is not the exact value $h_{opt}$ that is adopted, but this parameter ranges in the band width between $h_{opt} \pm \Delta h$, in which respect the range limits $\pm \Delta h$ are to be so selected that, within that range, the reduction in service life, due to the deviation from the optimum chip thickness, is less than the reduction in service life due to a similar increase in the cutting speed, with a constant speed of crankshaft rotation nKW.

What is claimed is:

1. A method of controlling machining of a moving workpiece at a plurality of machining locations simultaneously by separate tool units wherein a chip thickness in an optimum range is maintained for each of the simultaneously machined machining locations, cutting speeds at the plurality of machining locations are selected so that a maximum tool service life for each of the separate tool units is achieved while maintaining a predetermined cycle time for machining of the machining locations or of the moving workpiece, thereby attaining a maximum possible overall tool service life with respect to a sum of all simultaneously machined machining locations, and wherein initially for a first of the machining locations to be simultaneously machined, a maximum admissible cutting speed is set, ascertained therefrom are cutting speeds which apply in respect of any other of the plurality of machining locations, and the cutting speeds for all machining locations are raised when one of the cutting speeds which apply for any other machining location is above the maximum admissible limit.

2. A method as set forth in claim 1 wherein the chip thickness adopted is an optimum chip thickness as a function of a tool service life ($t_s=f(h)$).

3. A method as set forth in claim 1 wherein initially a maximum admissible cutting speed is predetermined to correspond to a minimum tool service life to be maintained.

4. A method as set forth in claim 1 wherein the cutting speeds of all machining locations are raised by the same value.

5. A method of controlling machining of a moving workpiece at a plurality of machining locations simultaneously by separate tool units wherein a chip thickness in an optimum range is maintained for each of the simultaneously machined machining locations, cutting speeds at the plurality of machining locations are selected so that a maximum tool service life for each of the separate tool units is achieved while maintaining a predetermined cycle time for machining of the machining locations or of the moving workpiece, thereby attaining a maximum possible overall tool service life with respect to a sum of all simultaneously machined machining locations, and wherein initially the cutting speeds are set at a lower limit.

6. A method as set forth in claim 5 wherein said lower limit is set in dependence on the predetermined cycle time for machining of the machining locations or of the overall crankhaft.

7. A method as set forth in claim 5 wherein the chip thickness adopted is an optimum chip thickness as a function of a tool service life ($t_s=f(h)$).

8. A method as set forth in claim 5 wherein initially a maximum admissible cutting speed is predetermined to correspond to a minimum tool service life to be maintained.

* * * * *